United States Patent [19]

Gaigl

[11] Patent Number: 5,490,772
[45] Date of Patent: Feb. 13, 1996

[54] APPARATUS FOR INTRODUCING ARTICLES INTO AND/OR REMOVING ARTICLES FROM A MACHINE

[76] Inventor: Karl-Josef Gaigl, Gaisenrain 20, D-78224 Singen, Germany

[21] Appl. No.: 182,208
[22] PCT Filed: Jun. 25, 1992
[86] PCT No.: PCT/EP92/01433
  § 371 Date: Jan. 7, 1994
  § 102(e) Date: Jan. 7, 1994
[87] PCT Pub. No.: WO93/01023
  PCT Pub. Date: Jan. 21, 1993

[30] Foreign Application Priority Data
Jul. 9, 1991 [DE] Germany .................. 41 22 617.8

[51] Int. Cl.⁶ .................. B29C 45/42; B29C 45/14; B23Q 16/04
[52] U.S. Cl. .................. 425/126.1; 414/749; 414/787; 425/444; 425/556
[58] Field of Search .................. 425/436 R, 436 RM, 425/444, 556, 126.1; 414/749, 787

[56] References Cited

U.S. PATENT DOCUMENTS 3,381,578  5/1968  Buchanan .................. 409/50
4,901,589  2/1990  Gaigl .................. 425/444

FOREIGN PATENT DOCUMENTS 1562169  4/1969  France.
9008625  8/1990  WIPO.

*Primary Examiner*—James P. Mackey
*Attorney, Agent, or Firm*—Bachman & LaPointe

[57] ABSTRACT

In an apparatus for introducing articles into and/or removing articles from a machine, in particular a mold cavity between two mold halves of an injection molding machine, a handling arrangement is connected to a slider by way of transmission elements. The slider forms a guide passage between two strip portions for an entrainment member which rotates eccentrically about an axis of rotation (A) and which in limit positions can move out of the guide passage, the slider being held in the limit positions by a locking unit. In that assembly the entrainment member is arranged eccentrically on a cam disk which actuates a rotary lever cooperating with one of the strip portions that form the guide passage.

15 Claims, 7 Drawing Sheets

APPARATUS FOR INTRODUCING ARTICLES INTO AND/OR REMOVING ARTICLES FROM A MACHINE

BACKGROUND OF THE INVENTION

The invention concerns an apparatus for introducing articles into and/or removing articles from a machine.

In many areas in industrial manufacture, a suitable item of production equipment is used to carry out operations in which given articles must first be introduced into the equipment and/or removed again therefrom after a working step has been concluded. In the present case, reference is made in particular to the activity of an injection molding machine, but the present invention is not to be restricted thereto. There are a large number of production installations in which the present invention can be used.

An operation of introducing articles is involved in particular when for example material is to be injection-molded around the articles in an injection molding machine. Just by way of example, reference is made here to the operation of injecting material around hollow or tubular needles.

In addition a large number of high-value articles require orderly removal and deposit on a further transportation assembly.

An apparatus of the general kind set forth for the removal of articles from for example a mold cavity between two mold halves of a machine, in particular an injection molding machine, is disclosed in WO-A1-90/08625; in that apparatus, connected to a mold half is a drive element which drives a drive wheel on the other mold half and thereby causes a rocker member to produce a pivotal movement. An arm having a removal device can be moved by way of the rocker member out of the mold cavity, by virtue of the rocker member sliding into a passage between two guide strip portions and moving out of that passage in each limit position of the arm; the arm is respectively fixed in those limit positions between a fixed abutment and a further element. In each limit position a locking unit which is fixed on the mold half, together with the respective abutment, causes the arm to be fixed in position. That apparatus has proved successful in practice, but it is of a not inconsiderable structural size and is therefore suitable in particular for larger injection molding machines. However, having regard to the required level of quality of manufactured articles, it is nowadays becoming more and more necessary to develop robots for smaller-size injection molding machines, which robots can introduce articles into such injection molding machines and remove them in an orderly fashion.

FR-A-1562169 describes an apparatus with which tools on machine tools are to be automatically moved into position, in regard to stepwise axial indexing thereof.

SUMMARY OF THE INVENTION

In consideration of that state of the art, the invention is based on the object of developing, in particular for smaller production installations, an efficient robot which operates in a trouble-free fashion but which is of only small dimensions.

That object is attained by the teaching of the present invention.

In accordance with the invention, the entrainment member is arranged eccentrically on a cam disk which actuates a rotary lever which cooperates with one of the abutment strip portions forming the guide passage, for locking of the slider in the limit positions. The rotary or pivotal lever therefore serves for fixing the respective limit position, there are no particular transmission elements for fixing the limit positions; the rotary or pivotal lever cooperates directly with the cam disk which replaces the cranks, or with the one strip portion forming the guide passage. Thus elements which already serve to drive the slider are used for the purposes of fixing the limit positions, the number of elements required is reduced and the entire apparatus is simplified. As a result the structural unit can be kept smaller and is less susceptible to wear.

The rotary lever bears with a follower roller against the periphery of the cam disk; the rotary lever is influenced by a variation in the periphery of the cam disk. In that way the rotary lever itself is moved out of a retaining position directly by the cam disk or, following the cam disk, the rotary lever can move into a retaining position. That direct dependency of the rotary lever on the movement of the cam disk permits an absolutely exact setting to be achieved when the rotary lever is to move out of or into its retaining position. Even when the apparatus is in operation for a prolonged period in time, no variation occurs so that reliable fixing of the limit positions is always achieved.

In the present embodiment the cam disk has two peripheral portions which are each of a different radius. Between the radii the portions are connected together by rising surfaces which produce deflection of the rotary lever. In that situation, the entrainment member, the cam follower and the rising surfaces are to be so associated that the cam follower roller is at the beginning or the end of a rising surface when the entrainment member is moving into or is moving out of the guide passage. If for example the entrainment member which is preferably also in the form of a roller is to move into the guide passage, and thus linearly move the slider, it is absolutely essential that a locking effect is released at that moment. Accordingly, at that moment, the cam follower roller on the rotary lever is disposed at the beginning of a rising surface. As soon as the cam follower roller has moved even only by a fraction on the rising surface, the limit position-fixing effect is already to be eliminated. That is achieved in particular by virtue of the fact that a retaining nose or projection which is necessary for fixing the limit position has an inclined abutment edge which cooperates with a corresponding edge on the strip portion.

It will be appreciated that the same also applies in regard to the other limit position in which the rotary lever bears by way of a support nose or projection having an inclined surface, against an inclined surface of the strip portion.

It is self-evident that the rotary lever is arranged relatively near to the cam disk and rotates there about a pivot pin. The pivot pin extends approximately parallel to the axis of rotation of the cam disk. So that the rotary lever always bears with its cam follower roller against the periphery of the cam disk, there is provided a coil spring which stationarily supports the rotary lever.

In particular the simplification in the selected method of fixing the limit position which operates in an absolutely neat and trouble-free fashion is to be emphasized.

So that the user has the choice of whether he wants to operate a production installation with or without a robot, it is additionally provided in accordance with the invention that the apparatus can also be uncoupled from the production installation. As the entrainment member is fixedly operatively connected to the production installation, it is envisaged in accordance with the invention that the one strip portion by way of which the handling arrangement is pivoted for example into the mold cavity of an injection molding machine is to be adapted to be removable so that it is no longer in the access region of the entrainment member. For that purpose the strip portion is suspended on sliding pins which preferably pass through the slider so that no additional space whatsoever is required.

On the other side of the strip portion the sliding pins are to be connected together by way of a pin member which also passes through an inclined guide slot in a sliding member. As that sliding member is carried displaceably on the slider, the pin member follows the guide slot upwardly or downwardly, depending on the respective displacement of the sliding member, whereby the strip portion is raised or lowered.

A pneumatic cylinder unit whose piston rod is connected to the sliding member is envisaged as a drive means for the sliding member. However, other drive means can also be envisaged here and are to be embraced by the concept of the invention.

So that no unintentional downward movement of the strip portion can occur, a locking effect is provided for the strip portion in the raised limit position thereof. The locking effect is produced by a retaining pawl which fixes the pin member in the raised limit position.

BRIEF DESCRIPTION OF THE DRAWINGS

Further advantages, features and details of the invention will be apparent from the following description of preferred embodiments and with reference to the drawings in which.

DETAILED DESCRIPTION

Figure 1:
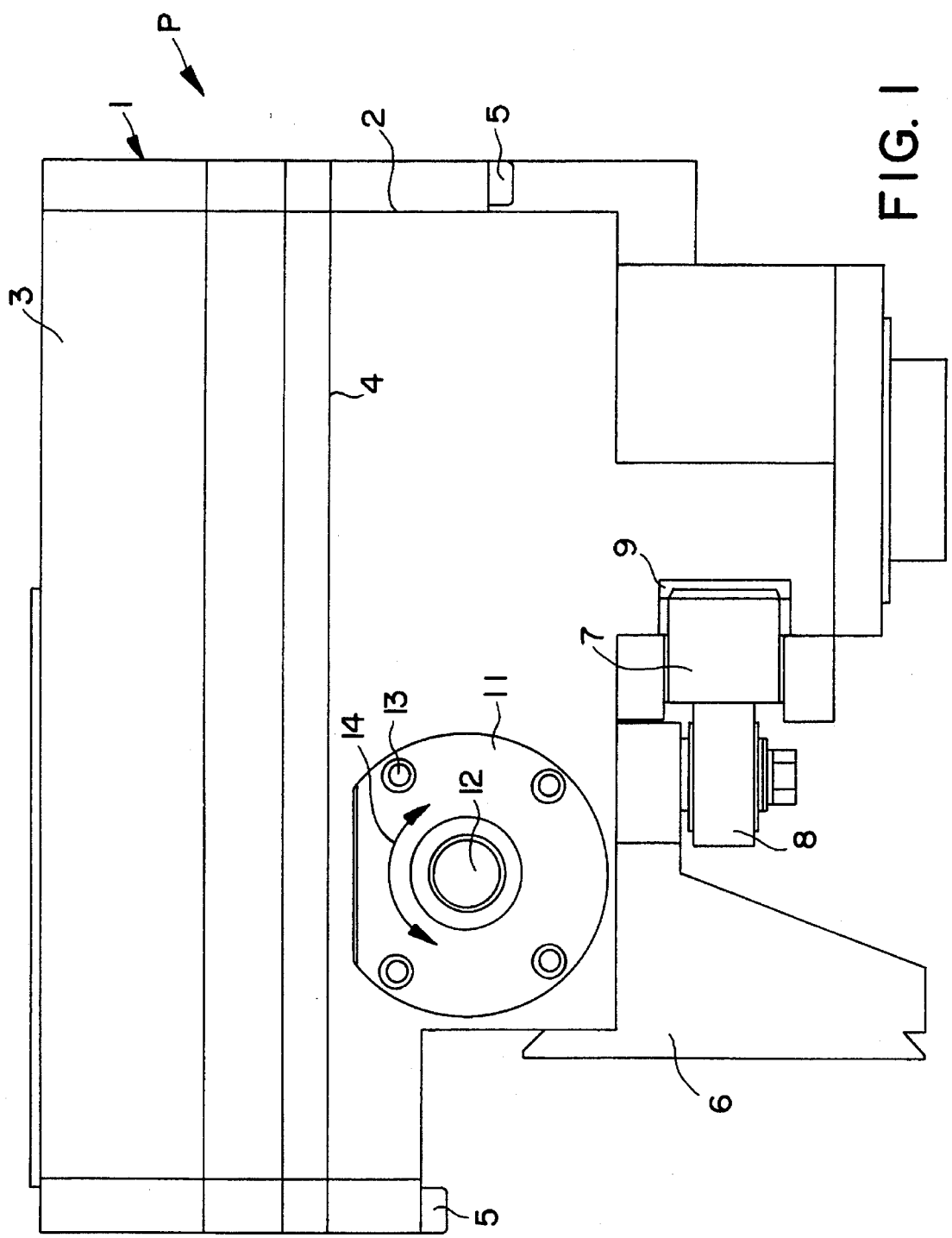
FIG. 1 is a side view of an apparatus according to the invention for introducing and/or removing articles in particular into and/or from a mold cavity of an injection molding machine.

Referring to FIG. 1, an apparatus P for introducing articles into and/or removing articles from in particular a mold cavity of an injection molding machine (not shown) has a housing 1 which comprises a lower housing portion 2 and an upper housing portion 3. The connecting line between the two housing portions 2 and 3 is identified by reference 4. The connection is made for example by way of screw bolts 5.

Such an apparatus P also has a connecting flange 6 by way of which the apparatus P is connected to one mold half of the injection molding machine. In addition a toothed rack 7 at least partially passes through the housing 1 or the lower housing portion 2, the rack 7 being fixed in a manner also not shown to an oppositely disposed mold half of the injection molding machine. The rack 7 is held by way of a backing support roller 8 in engagement with the tooth arrangement 9 of a gear 10 which is shown in greater detail in FIG. 3.

Also shown is a rotary disk 11 having a rotary axis or spindle 12 which passes through the housing 1. A handling arrangement can be connected by flange means to the rotary disk 11 by means of suitable fixing elements which pass through bores 13. The handling arrangement is then rotatable in the direction of the double-headed arrow 14 and can thus be pivoted into and out of the mold cavity of an injection molding machine. Then, disposed on the handling arrangement are suitable sucker members or like removal devices, by means of which a product which has just been manufactured by injection molding is held fast and removed from the mold cavity by a suitable pivotal movement. The product is then deposited for storage in an orderly manner, which can be effected in any desired fashion.

Figure 2:
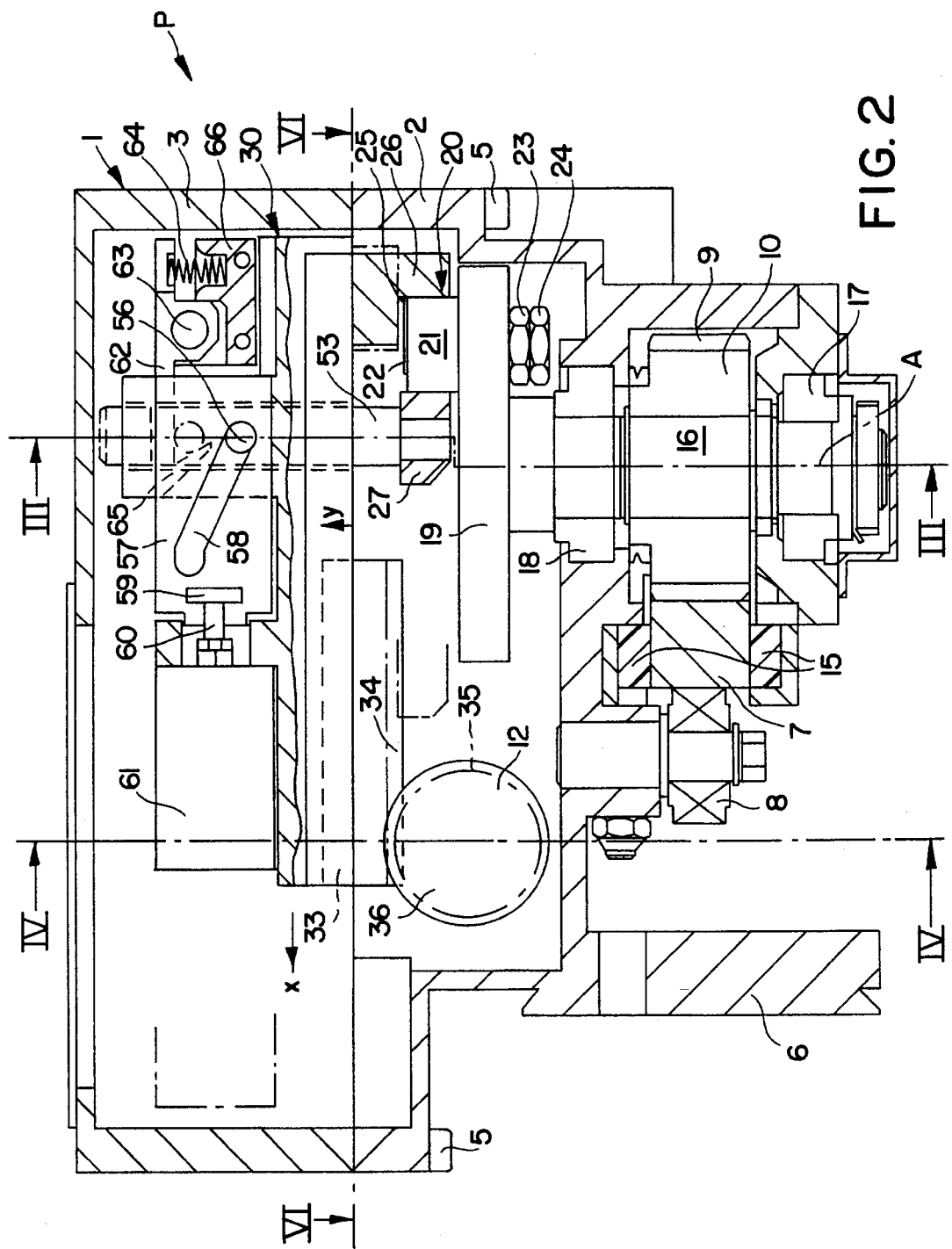
FIG. 2 is a view in longitudinal section through the apparatus of FIG. 1.

It can be clearly seen from FIG. 2 that the rack 7 is guided in plastic guides 15 which permit a reliable end wear-free sliding movement of the rack 7.

The gear 10 is fitted on a shaft 16 which rotates in suitable bearings 17 and 18. The gear 10 itself is non-rotatably connected to the shaft 16. Further mounting means and bearing means for the shaft 16 are not shown and described herein, for the sake of enhanced clarity. They are commercially conventional.

Figure 5:
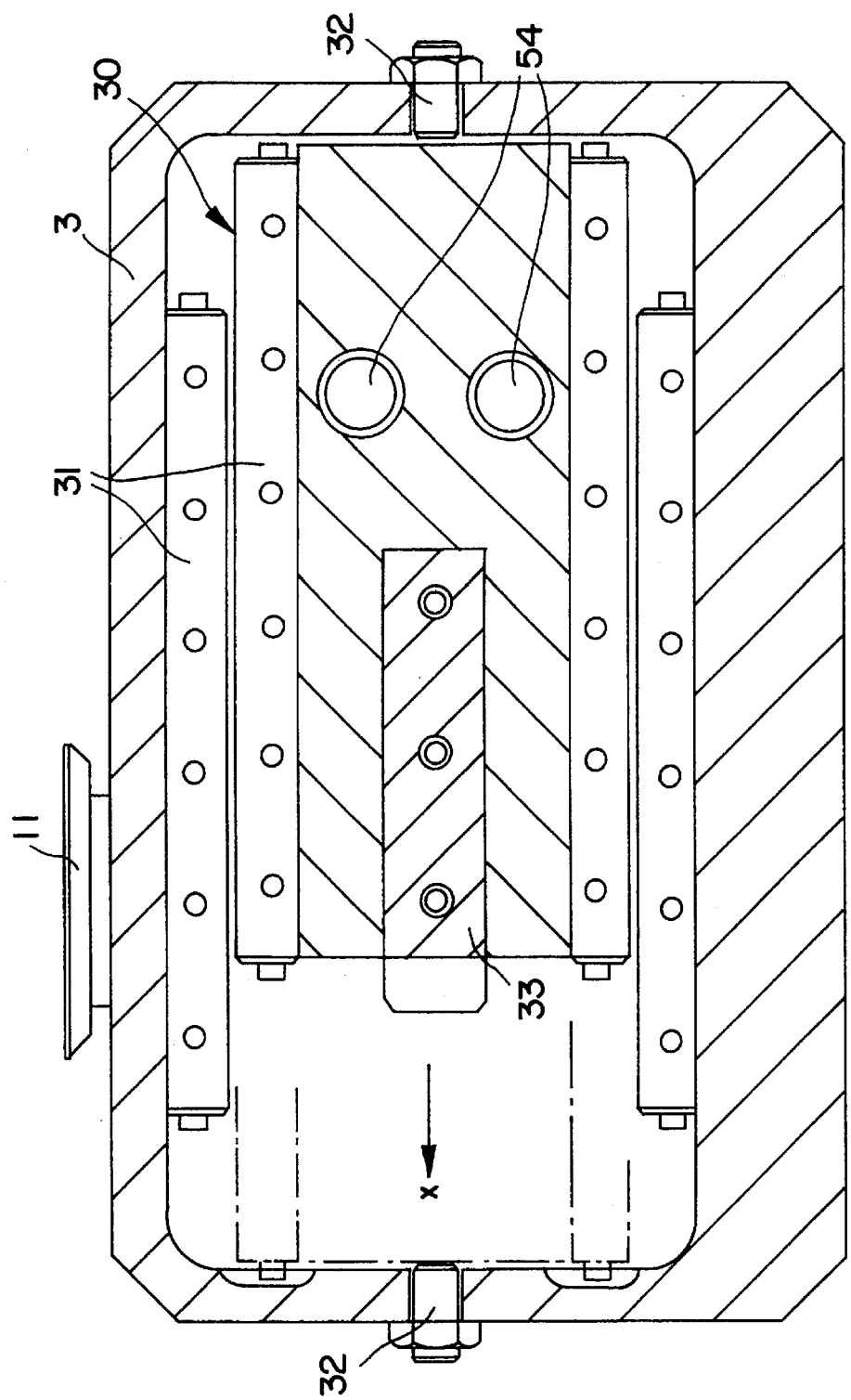
FIG. 5 is a view in horizontal section through the apparatus according to the invention taken along line V—V in FIG. 4.

An essential component is a cam disk 19 which delimits the shaft 16 in an upward direction. Eccentrically carried in the cam disk 19 is an entrainment member 20 which in the present embodiment comprises a roller 21 which rotates about a pin 22 fixed to the cam disk 19 by a nut 23 and a lock nut 24. Upon rotary movement of the shaft 16 about the axis of rotation A, the entrainment member 20 rotates at a radius around the axis of rotation A. In that rotary movement, over portions of its travel, as will be described in greater detail hereinafter, the entrainment member 20 engages into a guide passage 25 which is formed by a passage bar or strip portion 26 and a removable abutment bar or strip portion 27. This can be still better seen from FIG. 6, wherein the roller 21 is just moving into the guide passage 25. When the cam disk 19 is further rotated in the direction of rotation indicated by reference z, the roller 21 moves deeper into the guide passage 25; in doing that, it presses against the removable abutment strip portion 27 and thereby moves a slider 30 in FIG. 2 in the direction indicated by the arrow x. As shown in FIG. 5, sliding guides 31 as are commercially conventional are provided for the slider 30. The slider 30 is supported by the sliding guides 31 on both sides against the upper housing portion 3. In addition, provided in the upper housing portion 3 are adjustable abutments 32 with which the movement of the slider 30 in the direction x or in the opposite direction thereto can be limited or adjusted.

Figure 4:
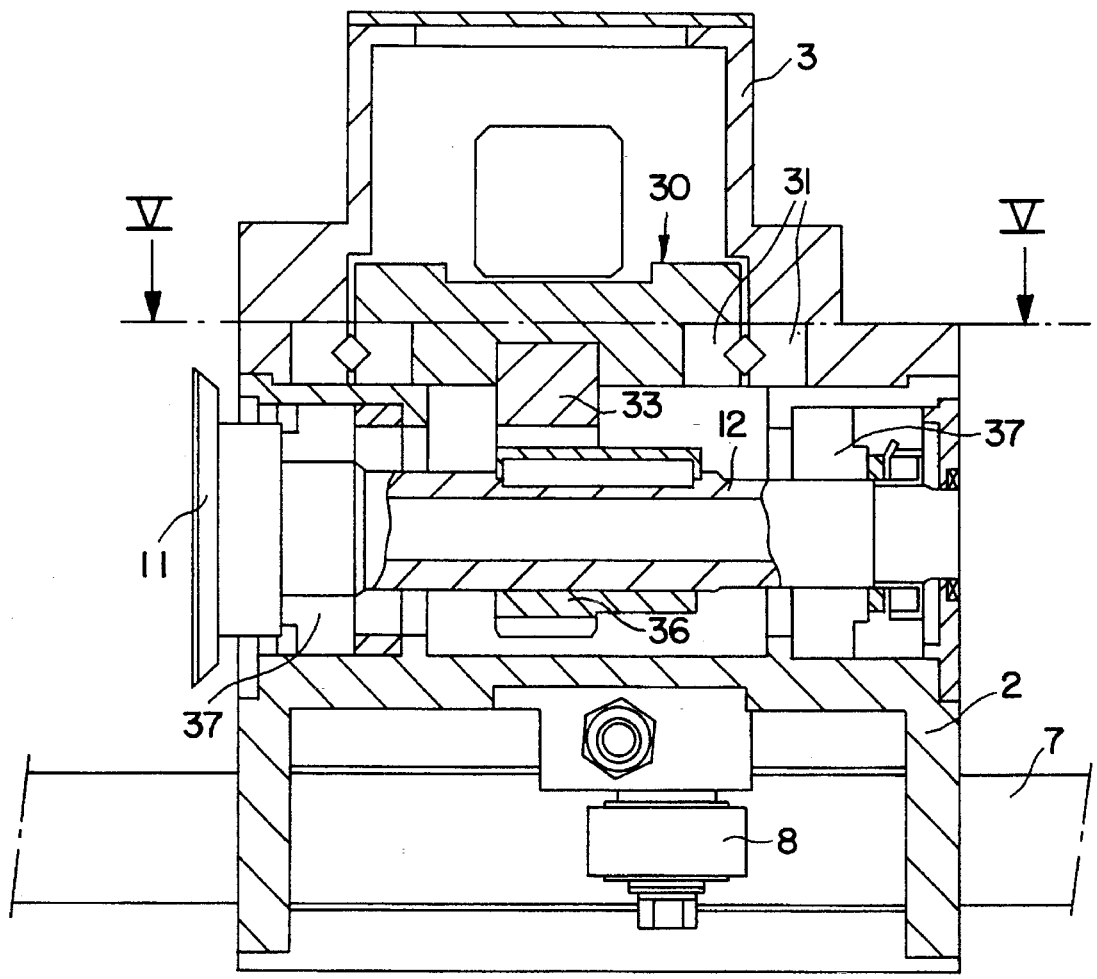
FIG. 4 is a view in cross-section through the apparatus according to the invention taken along line IV—IV in FIG. 2.

In addition, an essential aspect in relation to the slider 30 is a toothed rack portion 33 which is fitted into the slider 30. The tooth arrangement 34 of the rack portion 33 is connected to the tooth arrangement 35 of a spur gear 36 which in turn is fitted on the shaft or spindle 12. That is shown in greater detail in FIG. 4. It will be appreciated that the shaft 12 rotates in suitable bearings 37. Here too, further elements involved in fixing the spindle 12 in position are not shown in detail as they are commercially conventional.

As described above, the rotary disk 11 is rotated by way of the shaft 12 and thereby the corresponding handling arrangement is moved into the mold cavity between two mold halves of an injection molding machine and pivoted out of the mold cavity again after picking up an article to be removed therefrom. That is effected in dependence on the movement of the mold halves relative to each other, which is transmitted to the gear 10 by way of the rack 7. Depending on the respective movement of the rack 7, the rotary shaft 16 is rotated about its axis of rotation A in one direction or the other, the cam disk 19 following the shaft 16 in such movement. In that situation, the roller 21 respectively presses either against the removable abutment strip portion 27 or, in the event of a rotary movement in the opposite direction to the direction z, against the passage strip portion 26, so that the slider 30 is moved either in the direction x or in the opposite direction to the direction x. The movement of the slider 30 is then transmitted by way of the rack portion 33 to the spur gear 36 and thus the shaft 12.

The essential consideration is that in both limit positions the roller 21 leaves the guide passage 25. That means that the apparatus P operates completely independently of any overriding of the limit position by the mold halves. If for example a movable mold half of the injection molding machine should override its limit position by a few centimeters, which is possible at any time having regard to the considerable weights of such mold halves in larger machines, the slider 30 is not entrained in that situation as the roller 21 has slid out of the guide passage 25 and the slider 30 is simultaneously held in its limit position, as is described hereinafter. That always ensures that the handling arrangement has guaranteed access to the article to be removed, irrespective of the extent to which the mold halves override their limit position.

Figure 6:
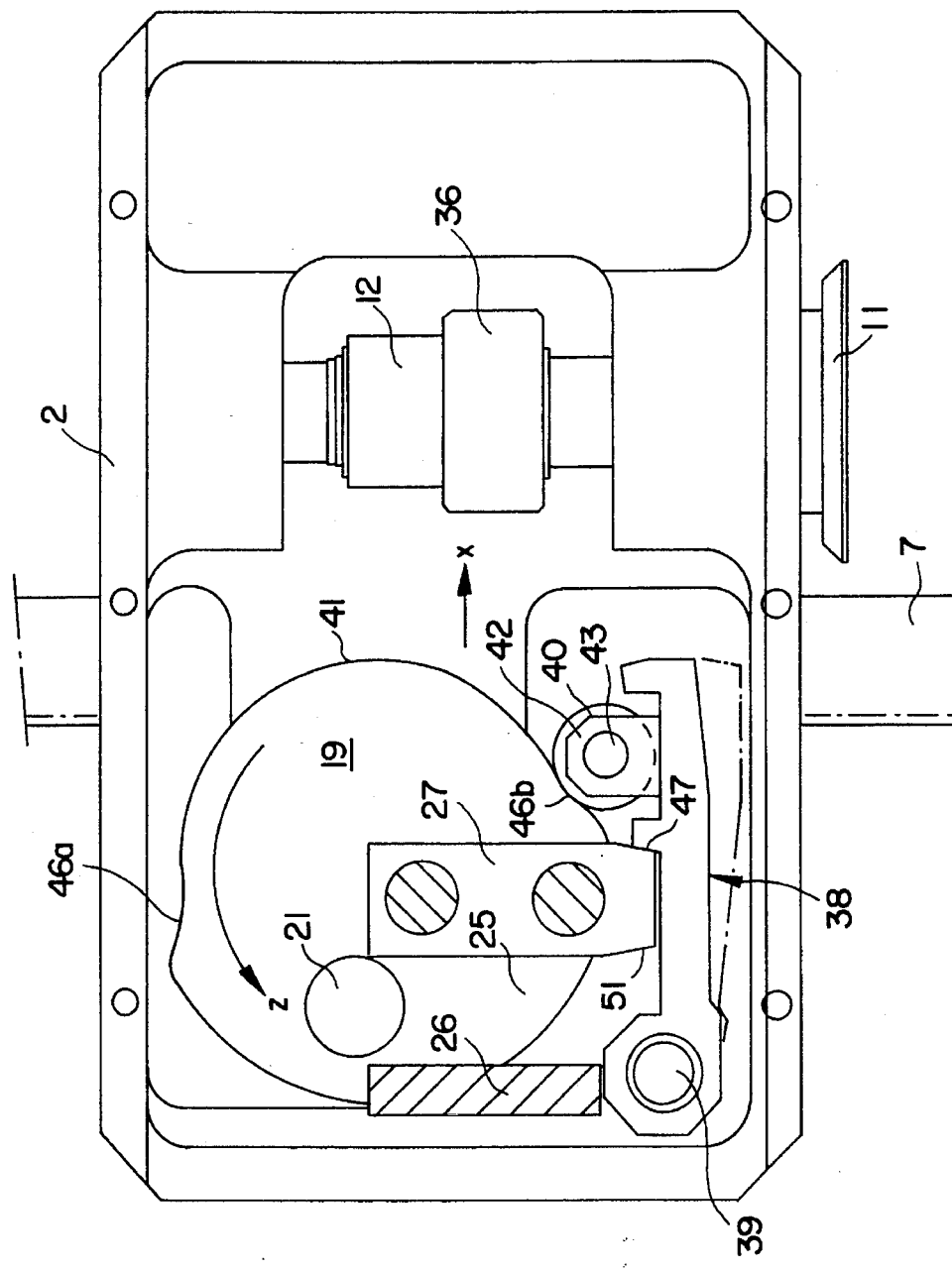
FIG. 6 is a partly sectional plan view of an apparatus in the open condition, the plan view being taken along line VI—VI in FIG. 2, and FIGS. 7a–7d are diagrammatic plan views of various cooperating elements of the apparatus according to the invention in different operating stages.

The slider 30 is fixed in its limit positions by an arrangement as is shown in greater detail in FIG. 6. In that arrangement, associated with the cam disk 19 is a rotary or pivot lever 38. A pivot pin 39 which is fixed with respect to the housing passes through the rotary lever 38 at one end. The lever 38 rotates about the pivot pin 39, being supported by way of a cam follower roller 40 against a periphery 41 of the cam disk 19. In that arrangement the cam follower roller 40 is disposed between two side bars 42 and is there also mounted rotatably about an axis 43.

Figure 3:
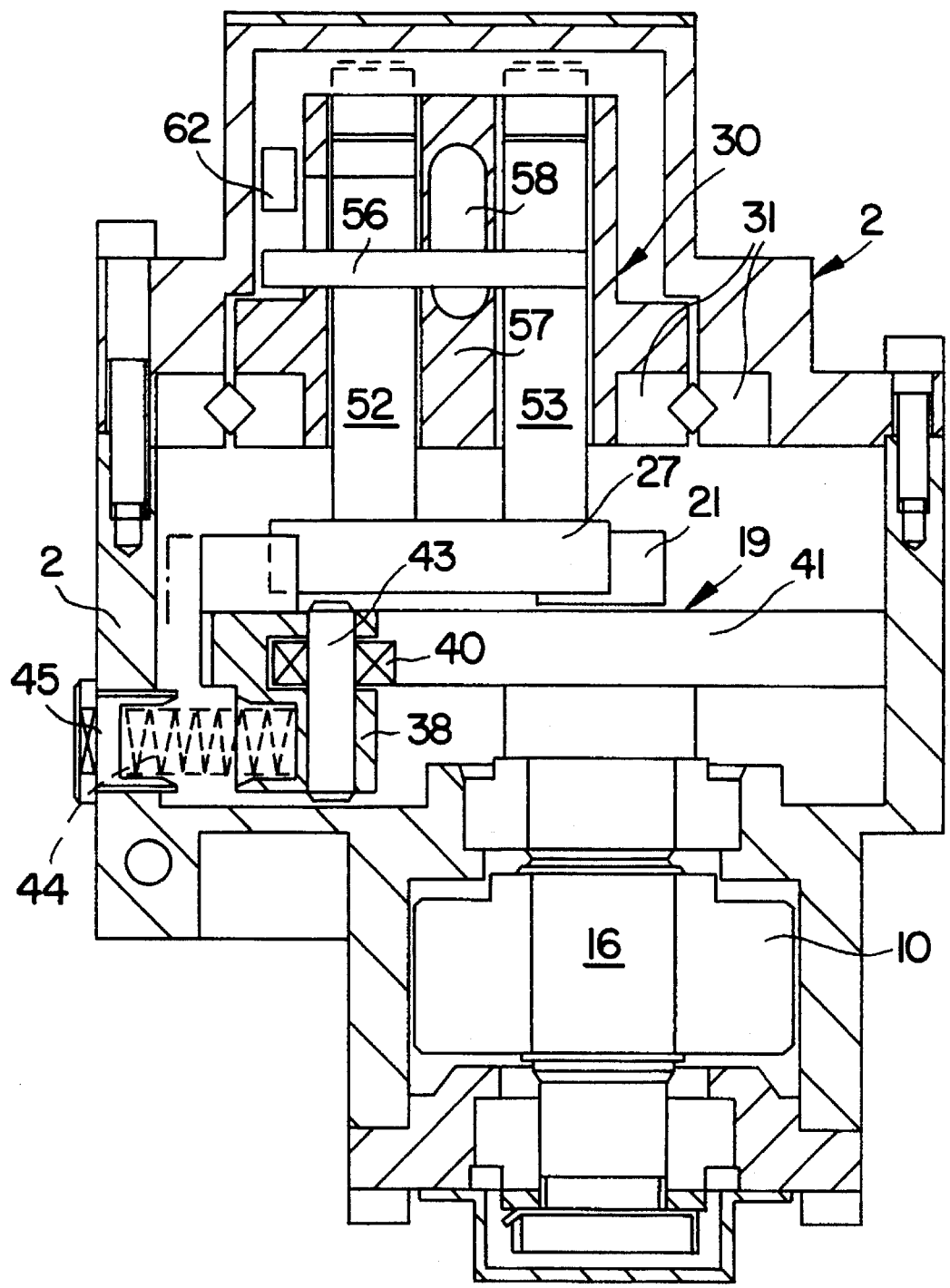
FIG. 3 is a view in cross-section through the apparatus according to the invention taken along line III—III in FIG. 2.

So that the lever 38 or the cam follower roller 40 always follows the periphery 41 of the cam disk 19, as shown in FIG. 3 the arrangement has a coil spring 44 which is supported at one end against the lever 38 and at the other end against the lower housing portion 2 where it is held by a suitable sleeve 45.

At its periphery the cam disk 19 has two portions with different radii r1 and r2. The radii r1 and r2 are measured from the center point M of the disk (see FIG. 7). Provided at each of the transitions from the smaller radius r1 to the larger radius r2 is a respective rising surface 46a and 46b against which the cam follower roller 40 also rolls. In that connection, the beginning of each rising surface 46a and 46b for the cam follower roller 40 is disposed precisely at the location at which the roller 21 also moves into the guide passage 25. Before the roller 21 moves into the guide passage 25 in that way, the cam follower roller 40 still rolls against the peripheral portion 41a of the cam disk 19, which is of the smaller diameter r1. That means that the lever 36 is in an inwardly pivoted position in which it engages with a retaining projection or nose 46 behind an edge 47 of the removable abutment strip portion 27. Moreover, the edge 47 is inclined at a given angle, while an abutment edge 48 of the retaining projection 46 is also inclined in the same fashion. The inclined positioning is so selected that the abutment strip portion 27 is already released at the moment at which the cam follower roller 40 begins to run on to the rising surface 46b or when the roller 21 first begins to move into the guide passage 25, although the retaining projection 46 has not yet pivoted entirely out of the region of contact with the abutment strip portion 27. That ensures that the abutment strip portion is always released at the beginning of the movement of the slider.

Figure 7B:
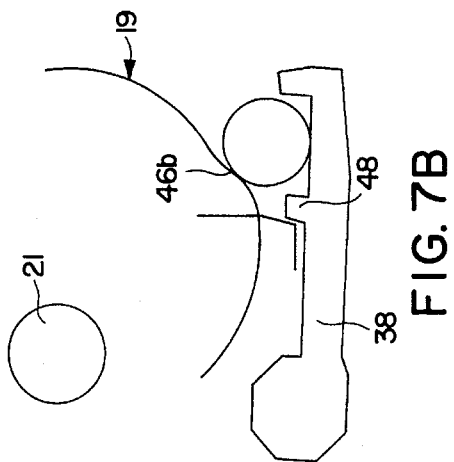
Figure 7A:
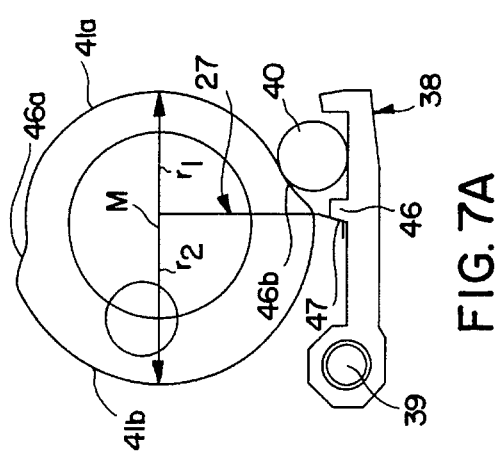

FIG. 7a indicates the moment at which the cam follower roller 40 begins to run on to the rising surface 46b. In FIG. 7b the cam follower roller 40 has already half moved on to the rising surface 46b while in FIGS. 7c and 7d the abutment strip portion 47 is definitively released.

Figure 7D:
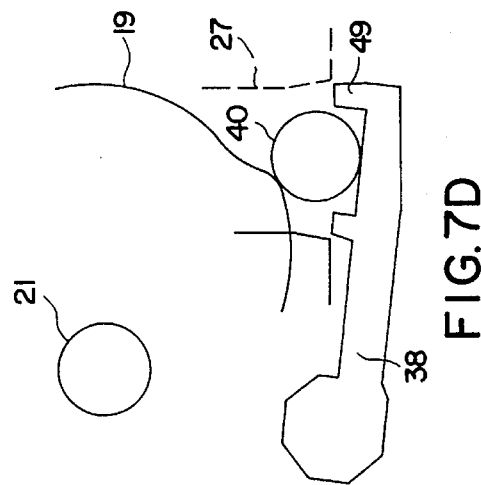
Figure 7C:
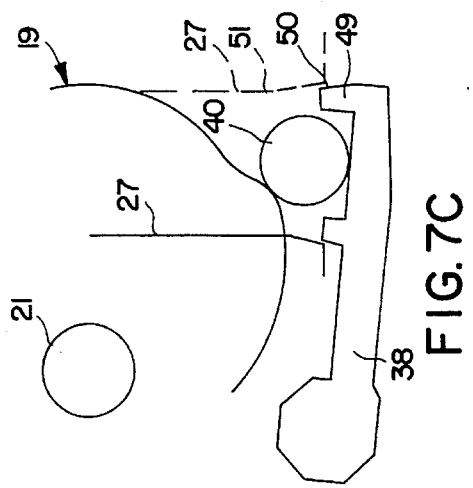

FIGS. 7c and 7d also indicate in dash-dotted lines the other limit position of the slider 30. In the other limit position, the abutment strip portion 27 is disposed in the position shown in dash-dotted line. At that time the roller 21 is also moving out of the guide passage 25 again and at the same time the cam follower roller 40 rolls against the rising surface 46a from the portion 41b with the larger radius r2 to the portion 41a with the smaller radius r1. That means that the lever 38 is pivoted into a position of being closer to the cam disk 19 again, with a support projection 49 bearing by way of an inclined surface 50 against an inclined surface 51 of the abutment strip portion 27. That inclined surface 51 is disposed on the other side from the edge 47. That secures the slider 30 in the other limit position. It is then released again only when the cam disk 19 has been rotated in a direction opposite to the direction z and the roller 21 moves into the guide passage 25 again. That procedure is continuously repeated in every opening and closing cycle of the injection molding machine.

In some cases it is desirable for the robot to be uncoupled from the movement of the mold halves of the injection molding machine. That situation occurs for example when orderly removal is not to be effected. Uncoupling is effected in a simple fashion by raising the removable abutment strip portion 27 in the direction y, as shown in FIG. 2. The abutment strip portion 27 is carried by two sliding pins 52 and 53. The sliding pins 52 and 53 also pass through corresponding sliding guides 54 (see FIG. 5) in the slider 30. After the slider 30, the sliding pins 52, 53 are connected together by way of a pin member 56 which also passes through a sliding member 57. The sliding member 57 is arranged displaceably on the surface of the slider 30 and has an inclinedly extending guide slot 58 for the pin member 56. Towards its end the sliding member 57 is connected to a piston rod 60 by way of a connecting head 59 which is let into the sliding member 57. The piston rod 60 engages into a pneumatic cylinder unit 61.

When the cylinder 61 is put under pressure, the piston rod 60 moves the sliding member 57 in the opposite direction to the direction indicated by the arrow x, in which case the pin member 56 moves upwardly in the guide slot 58 until it has occupied the position shown in dash-dotted line. However, by way of the sliding pins 52, 53, the pin member 56 also entrains the abutment strip portion 27 upwardly in the direction indicated by the arrow y so that the abutment strip portion 27 moves out of the region of contact with the roller 21. The roller 21 is thus freed at one side so that the handling arrangement can no longer be moved into the mold cavity between the two mold halves. On the other hand however the roller 21 is still operatively connected to the passage strip portion 26 so that this at any event still guarantees that the handling arrangement is pivoted out of the mold cavity. That is a safety factor in regard to the entire installation.

Moreover, for the purposes of holding the pin member 56 in its position shown in dash-dotted line, the apparatus has a retaining pawl 62 which is pivotable about a pivot 63. At the other end the retaining pawl 62 bears against a coil spring 64. When the pin member 56 is raised, a catch hook 65 of the retaining pawl 62 is also raised against the pressure of the coil spring 64 so that, after passing beyond a given point, the catch hook 65 can then snap back into the catch position.

The retaining pawl 62 and the coil spring 64 or the pivot 63 are connected to the slider 30 by way of a suitable holder 66.

I claim:

1. An apparatus for at least one of introducing articles into and removing articles from a machine by a handling device, said apparatus comprising:

a transition element for connecting said handling device with said apparatus, wherein said transition element is rotatable about an axis of rotation thereof for driving said handling device;

a slider connected with said transition element for actuating said transition element, wherein said slider has two abutment strip portions removably attached to said slider which form a guide passage;

a cam disc connected to a shaft having an axis, said shaft drivably connected to and driven by said machine for driving said cam disc;

an entrainment member eccentrically arranged on said cam disc and rotatable eccentrically about said axis of said shaft, said entrainment member arranged to move along said guide passage and move said slider between a first and a second limit position, said entrainment member being outside said guide passage when said slider is in one of said first and said second limit position; and a locking unit including a rotary lever, wherein said rotary lever is actuated by said cam disc and cooperates with at least one of said abutment strip portions for releasably holding said slider in one of said first and said second limit positions.

2. Apparatus according to claim 1 wherein the rotary lever bears with a cam follower roller against the periphery of the cam disk.

3. Apparatus according to claim 2 wherein the cam disk has two peripheral portions which each have a different radius.

4. Apparatus according to claim 3 wherein the peripheral portions with the different radii are connected together by way of rising surfaces.

5. Apparatus according to claim 4 wherein the entrainment member, the cam follower roller and the rising surfaces are associated such that the cam follower roller is disposed at least one of the beginning and the end of a rising surface when the entrainment member at least one of moves into and passes out of the guide passage.

6. Apparatus according to claim 1 wherein the rotary lever has a retaining projection and a support projection which bear against at least one abutment strip portion from one side in each of the respective limit positions.

7. Apparatus according to claim 6 wherein the retaining projection has an inclined abutment edge which cooperates with a corresponding edge on the abutment strip portion.

8. Apparatus according to claim 6 wherein the support projection has an inclined surface which cooperates with an inclined surface on the abutment strip portion.

9. Apparatus according to claim 2 wherein the rotary lever is fixed on a pivot pin arranged parallel to the axis of rotation thereof and is supported by way of a coil spring which holds the cam follower roller in contact against the periphery of the cam disk.

10. Apparatus according to claim 1 wherein there is a contact region between an abutment strip portion and entrainment member and wherein said abutment strip portion is removable from said contact region.

11. Apparatus according to claim 10 wherein an abutment strip portion is suspended on sliding pins which are connected together by way of a pin member.

12. Apparatus according to claim 11 wherein the pin member passes through an inclined guide slot in a sliding member which is displaceable by means of a drive.

13. Apparatus according to claim 12 wherein the drive comprises a pneumatic cylinder unit whose piston rod is connected to the sliding member.

14. Apparatus according to claim 11 wherein the pin member is fixed in a raised limit position by a retaining pawl.

15. Apparatus according to claim 1 wherein said machine is an injection molding machine having two movable mold halves, wherein said cam disc is connected with at least one of said movable mold halves via said shaft such that said cam disc is driven by movement of at least one of said movable mold halves, wherein said movable mold halves form a mold cavity.

\* \* \* \* \*

UNITED STATES PATENT AND TRADEMARK OFFICE
CERTIFICATE OF CORRECTION

PATENT NO.   :   5,490,772
DATED        :   February 13, 1996
INVENTOR(S)  :   Karl-Josef Gaigl It is certified that error appears in the above-indentified patent and that said Letters Patent is hereby corrected as shown below:

In Column 8, claim 5, line 3, after "disposed"
    insert --at--.

Signed and Sealed this

Fifteenth Day of October, 1996

*Attest:*

BRUCE LEHMAN

*Attesting Officer*     *Commissioner of Patents and Trademarks*